… …

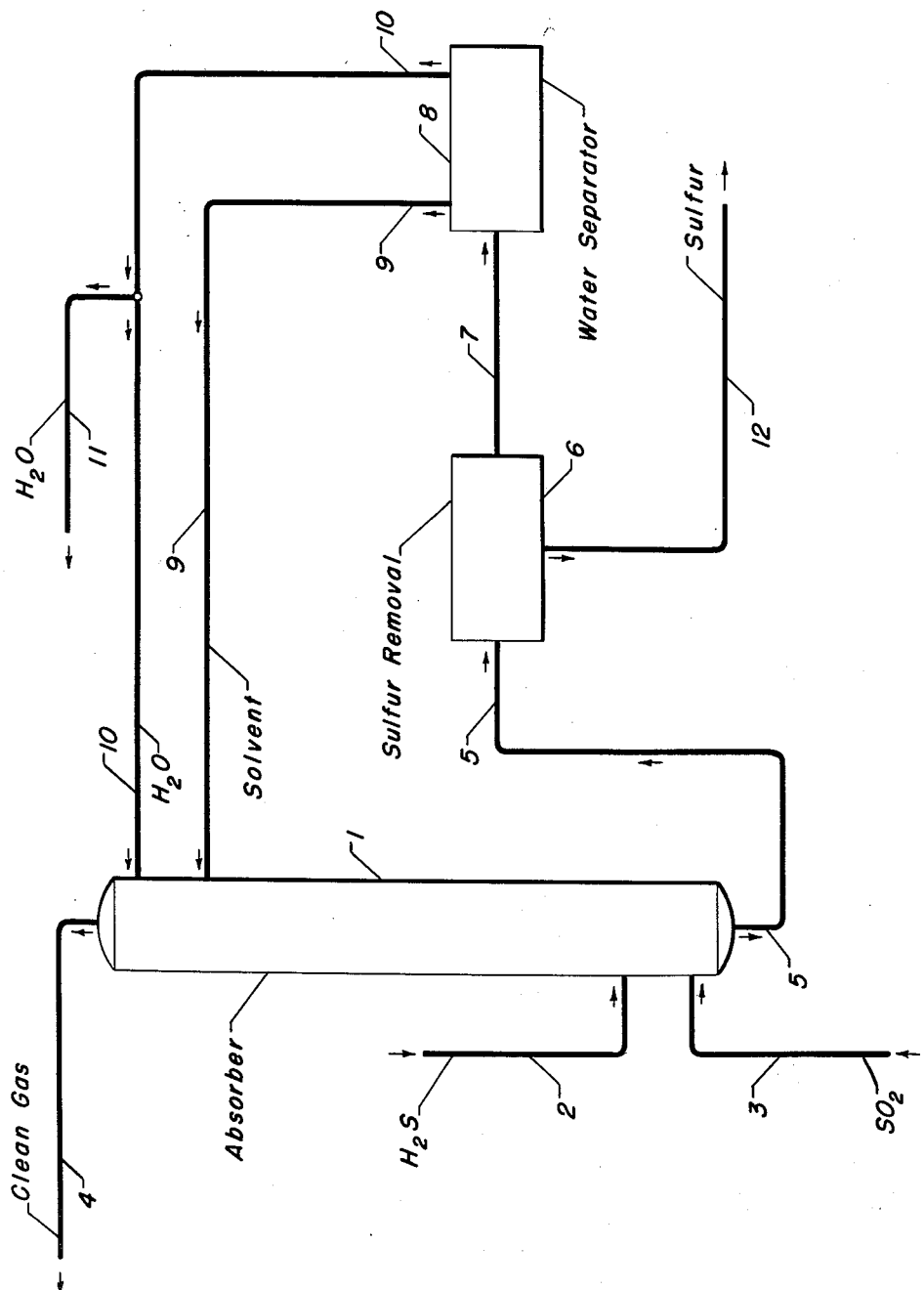

3,023,088
PRODUCTION OF SULFUR

Peter Urban, Northbrook, and Lester G. Massey, Arlington Heights, Ill., assignors to Universal Oil Products Company, Des Plaines, Ill., a corporation of Delaware
Filed July 5, 1960, Ser. No. 40,840
6 Claims. (Cl. 23—226)

This application is a continuation-in-part of our copending application Serial No. 554,591, filed December 21, 1955, now abandoned.

This invention relates to a process for the production of sulfur and particularly to a process for producing sulfur from hydrogen sulfide. In addition, the invention also relates to a process for purifying a gas stream by removing hydrogen sulfide from said stream.

In many industrial processes, large amounts of sulfur are wasted by being vented to the atmosphere as hydrogen sulfide. Typical of these are processes for preparing various petroleum products, coking of coal, steel manufacture and others. In many cases, the sulfur is a contaminant in the ultimate desired product and is converted to hydrogen sulfide during processing and disposed of in that form. Besides being wasteful, venting hydrogen sulfide to the atmosphere creates a nuisance which must be abated in many communities to conform with local regulations.

Several solutions to this problem have been put into effect and these mostly have been used to abate the nuisance rather than to conserve sulfur. The processes are usually difficult to effect and rather costly and usually consist of converting the hydrogen sulfide to sulfur or sulfuric acid or some other salable form. One such solution has been to separate the hydrogen sulfide from the main stream by such means as an absorber employing an alkaline liquid such as an amine or metal hydroxide solution in countercurrent contact with the hydrogen sulfide containing gas. The absorbing liquid is then stripped of $H_2S$ and $H_2S$ is partially burned to from $SO_2$ and water and the remaining $H_2S$ is reacted with the $SO_2$ to produce sulfur and water. The reaction is effected at high temperatures employing a heterogeneous catalyst such as bauxite and preferably at high pressure. This method has many unsatisfactory features including the expense and difficulty of concentrating $H_2S$ by means of an alkaline solution with subsequent stripping, the use of heterogeneous catalysts which are not too well suited to chemical processes resulting in solid products, the difficulty of using corrosive materials such as water-$SO_2$ mixtures at high temperature and, in fact, the difficulty of employing high temperatures. It is an object of this invention to provide a novel process for recovering substantially pure sulfur from a gas stream containing $H_2S$ or mercaptans. Because of the great abundance of $H_2S$ containing gas streams, this invention will be described primarily in relation to this particular compound. The process of this invention overcomes the difficulties hereinbefore enumerated by providing a simple, liquid phase, low temperature, non-catalytic process which results in large conversions of hydrogen sulfide to substantially pure sulfur.

One embodiment of this invention resides in a process for the production of sulfur which comprises absorbing sulfur dioxide and hydrogen sulfide in a carboxamide having the generic formula:

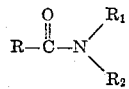

in which R, $R_1$ and $R_2$ are selected from the group consisting of hydrogen and alkyl radicals and having from about 0.5% to about 40% by volume of water dissolved therein, reacting the sulfur dioxide and hydrogen sulfide in contact with said solvent, thereby forming sulfur, and separating the sulfur from said solvent.

A specific embodiment of the invention is found in a process for the production of sulfur which comprises absorbing sulfur dioxide and hydrogen sulfide in a solvent comprising dimethylformamide, and having from about 0.5% to about 40% by volume of water dissolved therein, reacting the sulfur dioxide and hydrogen sulfide in contact with said dimethylformamide, thereby forming sulfur and separating the sulfur from said solvent.

Other objects and embodiments referring to alternative carboxamides having the generic formula hereinabove set forth will be found in the following further detailed description of the invention.

Briefly, the process of this invention provides for effecting the reaction between sulfur dioxide and hydrogen sulfide to form sulfur and water while these two reactants are absorbed in a common liquid medium. By providing for such solution or absorption, the molecules are apparently brought into close proximity with others so that reactions can occur more readily between them. In the process of this invention, the reaction occurs without a catalyst substantially to completion even at ambient temperatures in contrast to the process employing a vapor phase which requires high temperatures and a catalyst and which results in low conversions compared with the present process.

The solvent employed in this invention must have certain characteristics. Since a certain amount of water is required for the reaction to proceed rapidly, as will be hereinafter demonstrated, water must necessarily be soluble in the solvent to some significant extent. Another characteristic is that the solvent must be capable of absorbing or dissolving both hydrogen sulfide and sulfur dioxide. Another requirement of the solvent, although one that is easily met, is that it must not dissolve large quantities of sulfur inasmuch as a solvent having this characteristic would introduce another step in the process, namely recovering dissolved sulfur from the solvent.

Two distinct types of solvent may be used. The first is a solvent miscible in all proportions with water and when such a solvent is used, means must be provided to remove excess water from the solvent so that too much dilution does not occur. The other type of solvent is one whihc dissolves only limited quantities of water. A solvent with limited miscibility with water, to be used in this invention, must be capable of dissolving the necessary quantities of water to be hereinafter described and preferably is saturated within the desired water concentration range. When such a solvent is used, the excess water which results from the reaction may be removed simply by drawing off the aqueous phase.

It has now been discovered that not all organic solvents are suitable for the production of sulfur, certain oxygenated organic compounds such as the glycols although effective in some respects in forming sulfur possess the disadvantage of having the sulfur thus formed in a flocculent or tacky state which is difficult to recover by the commercial methods of separation. The sulfur formed by the use of glycols as the solvent in this process is difficult to separate by filtration. For example, solutions of sulfur suspended in diethylene glycol or triethylene glycol when subjected to filtration resulted in either the solutions passing through a filter without leaving any sulfur, or, after a period of time, said suspensions would clog the filter completely before any substantial amount of solution had passed through. However, in contradistinction to this, we have now discovered that when certain organic compounds such as carboxamides are utilized as the organic solvent in the process of this invention, the sulfur which is produced is crystalline in form as contrasted to the amorphous form of sulfur produced when glycols are used as solvents. The sulfur crystals formed when using a carboxamide as the organic solvent are large and readily filterable, whereas the sulfur crystals, when using glycols as the organic solvent, form into some type of gelatinous, compressible mass. However, this mass is tacky in contrast to the hard crystals hereinbefore set forth and thus cannot be readily filtered.

The particular organic compounds utilizable in this process, consisting of carboxamides having the generic formula:

$$R-\overset{O}{\overset{\|}{C}}-N\overset{R_1}{\underset{R_2}{\diagdown}}$$

in which R, $R_1$ and $R_2$ are selected from the group consisting of hydrogen and alkyl radicals containing from 1 to 4 carbon atoms, include formamide, acetamide, propionamide, n-butyramide, isobutyramide, N-methylformamide, N,N-dimethylformamide, N-ethylformamide, N,N-diethylformamide, N-propylformamide, N,N-dipropylformamide, N-butylformamide, N,N-dibutylformamide, N-methylacetamide, N,N-dimethylacetamide, N-ethylacetamide, N,N-diethylacetamide, N-propylacetamide, N,N-dipropylacetamide, N-butylacetamide, N,N-dibutylacetamide, N-propionamide, N,N-dimethylpropionamide, N-ethylpropionamide, N,N-diethylpropionamide, N-propylpropionamide, N,N-dipropylpropionamide, N-butylpropionamide, N,N-dibutylpropionamide, etc.

The process of this invention may be best described with reference to the accompanying drawing which is intended to be illustrative of the invention rather than limiting on its broad scope.

In the drawing, $H_2S$ or $H_2S$-containing gas from any source such as those hereinbefore described is introduced through line 2 into the lower portion of absorber 1. This gas may be, for example, the normally gaseous material in the effluent from a petroleum desulfurization or reforming process, in which case it is desirable to recirculate the hydrogen in the gas, but to remove the hydrogen sulfide from it since hydrogen sulfide has an adverse effect upon the catalysts employed in such process. In absorber 1, the rising hydrogen sulfide is mixed with $SO_2$ which is introduced into the lower portion of of absorber 1 through line 3 and the mixture is contacted with a descending water-containing carboxamide stream. Absorber 1 will contain internal means for effecting intimate contact between a rising gas stream and a descending liquid stream such as, but not limited to, perforated plates, bubble cap plates, turbo-grid trays, packing, screens or any other conventional device for causing such contact. The carboxamide in this embodiment is introduced into the upper portion of absorber 1 through line 9 and is obtained as will be hereinafter discussed.

The water for such an absorber may be introduced commingled with the carboxamide stream or preferably in a separate stream disposed above the carboxamide stream such as through line 10. The purpose of this is to remove carboxamide from the hydrogen sulfide-free gas stream discharging from the top of absorber 1 through line 4. This not only is conservative of carboxamide but prevents adverse effects which such solvent might have as an impurity in the gas stream.

As the carboxamide and water descend through absorber 1 they absorb hydrogen sulfide and sulfur dioxide. The carboxamide and water are maintained at a temperature of from about 0° to about 120° C. or higher and preferably from about 20° to about 100° C. The only temperature limitation on this process is that the temperature must be such as to have a liquid phase solvent at absorber conditions. When maintained at these conditions, the absorbed hydrogen sulfide and sulfur dioxide react to form pure sulfur and water. The resultant stream discharging from the bottom of absorber 1 through line 5, therefore, contains carboxamide such as those hereinbefore described, water, sulfur, and sometimes unreacted hydrogen sulfide and sulfur dioxide. It should be mentioned here that the selection of a suitable solvent and optimum operating conditions will cause substantially complete reaction of hydrogen sulfide with sulfur dioxide so that the residual unreacted components in the stream discharging from absorber 1 will be negligible. The material passing through line 5 passes to sulfur removal zone 6 wherein the sulfur is removed from the stream and thereafter passed out to a recovery zone, not shown, through line 12. When the sulfur product is solid it may be removed by filtration, centrifugally, by settling or any other known means of removing solid particles from a liquid. The sulfur may be removed as a liquid when the sulfur removal zone is a liquid when the sulfur removal zone is at a sufficiently high temperature, in which case it may simply be drawn off from the total liquid as a separate immiscible phase.

The sulfur-free liquid passes through line 7 to water separator 8 wherein the water formed in the reaction of $H_2S$ with $SO_2$ is removed to prevent a build-up of water in the circulating solvent stream. Water separator 8 may consist merely of a settling zone when the solvent employed dissolves only limited quantities of water. When the solvent is miscible with water to too great an extent, then water removal zone 8 must separate water from the solvent by some other means such as fractionation, evaporation, hydration of salts, etc. Water separator 8 may separate water only to the extent that it was added by the reaction in which case water will be withdrawn through lines 10 and 11 and the desired water-solvent mixture will pass to the top of absorber 1 via line 9. Water separator 8 may, however, separate more water from the solvent than what was added by the reaction in which case some water is withdrawn via line 11 but some is added to the upper portion of absorber 1 via line 10 to scrub solvent from the exit gas as hereinbefore described.

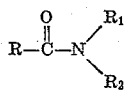

As will be hereinafter demonstrated, the solvent of this invention preferably contains from about 10.0% to about 40% by volume of water. It is preferred that the solvent employed have limited water solubility but it must dissolve at least 0.5% and preferably not more than 40% water at the temperature conditions in absorber 2. As hereinbefore stated, a carboxamide having these characteristics may conveniently be used since the water of reaction can be separated by settling and an elaborate fractionation zone is not required.

In addition to the continuous process hereinbefore described the process of this invention may also be effected in a batch type operation. When a batch type operation is used the desired carboxamide and the water are placed in an appropriate apparatus following which the sulfur dioxide and hydrogen sulfide are then bubbled through the solution. After a predetermined period of time has elapsed the solution containing the crystalline sulfur is then subjected to filtration whereby the sulfur is separated from the carboxamide and water.

The following examples are given to illustrate the process of the present invention which, however, are not intended to limit the generally broad scope of the present invention in strict accordance therewith.

*Example 1*

In this experiment anhydrous dimethylformamide was utilized as the organic solvent. The dimethylformamide was divided into three separate portions and water was added to each of the dimethylformamide portions to bring the solvent to the desired water content, the resulting solutions containing 10%, 20% and 30% by volume of water respectively. Following this each portion of the solvent was then divided into two aliquots and sulfur dioxide was added to one aliquot of each water concentration by bubbling the gas therethrough for a period of about five minutes. The sulfur dioxide content was then determined by iodine-titration, the aliquot portion of the 10% by volume of water concentration containing 1.3% by weight of sulfur dioxide, the 20% water portion contained 1.1% and the 30% water portion contained 0.9% by weight of sulfur dioxide. Hydrogen sulfide gas was bubbled into the other aliquot of the preselected solvent containing water for a period of from about 10 to about 20 minutes. This longer time for absorption of hydrogen sulfide is due to the fact that the solubility of hydrogen sulfide in the solvents is much less than that of sulfur dioxide. Following this the concentration of the hydrogen sulfide in the solvent was also determined by iodine-thiosulfate titration, the 10% water portion containing 0.6% by weight of hydrogen sulfide, the 20% water-dimethylformamide portion contained 0.6% and the 30% water-dimethylformamide portion contained 0.5% by weight of hydrogen sulfide.

The two aliquots of each of the different water concentrations were combined in graduated cylinders and the formation of sulfur therefrom observed. In the cylinder containing the 10% water-dimethylformamide solution pratically all of the sulfur precipitated out in crystalline form at the end of two minutes. The cylinder containing the 20% water-dimethylformamide solution showed a considerable precipitation of sulfur at the end of four minutes. At the end of eight minutes both of the dimethylformamide solutions containing 10 and 20% water had settled all of the sulfur while the dimethylformamide solution containing 30% water had settled to a considerable extent.

At the same time that the above experiments were being performed a similar experiment utilizing triethylene glycol was also run in a manner similar to that set forth above. That is, triethylene glycol containing about 2–4% water was divided into two portions, one portion having sulfur dioxide gas bubbled therethrough while the other portion had hydrogen sulfide gas bubbled therethrough. The aliquot portions were combined and mixed. At the end of eight minutes, during which time the sulfur in the dimethylformamide solutions had settled, the sulfur formed in the triethylene glycol solution still remained in a suspended state.

*Example II*

The carboxamide which is used in this example comprises anhydrous diethylformamide. The carboxamide is divided into three portions and water added thereto so that the final solution contains 10%, 20% and 30% water by volume, respectively. Each of the three solutions is divided into two aliquot portions. Sulfur dioxide gas is bubbled through one of the aliquot portions while hydrogen sulfide gas is bubbled through the other. The two portions are combined and mixed thereby causing the formation of sulfur. The sulfur will precipitate in a crystalline form within a relatively short period of time and is easily separable from the solution by conventional means such as filtration.

*Example III*

Dimethylacetamide is treated with water so that three portions will contain 10%, 20% and 30%, respectively. Each of the water-dimethylacetamide solutions is divided into two aliquot portions, one portion having sulfur dioxide gas bubbled therethrough while the other portion has hydrogen sulfide gas bubbled therethrough. After completion of the addition of sulfur dioxide and hydrogen sulfide to the aliquot said aliquot in each water concentration range are combined. The sulfur thus produced will precipitate in a crystalline state in each of the solutions within a relatively short period of time and will be easily separable by filtration.

*Example IV*

In this experiment anhydrous diethylacetamide is treated in a manner similar to that set forth in the above examples, that is, three solutions containing 10%, 20% and 30% by volume of water, respectively, are prepared. Each of these water-diethylacetamide solutions are divided into two aliquot portions and are treated with hydrogen sulfide gas and sulfur dioxide gas. After completion of the gas addition the two portions in each water range are combined and mixed. The sulfur thus produced will precipitate in a crystalline form and will be easily separable by filtration.

*Example V*

In this experiment a predetermined amount of dimethylpropionamide is divided into three portions and water added thereto so that the total content of water is 10%, 20% and 30% by volume, respectively. Each of the resulting solutions is divided into two aliquot portions and sulfur dioxide gas is bubbled through one portion while hydrogen sulfide gas is bubbled through the other portion. Upon completion of the gas addition the two portions are combined. The sulfur, as in the solutions described in the above examples precipitate in a crystalline form and will be easily separable by conventional means such as filtration.

We claim as our invention:

1. A process for the production of sulfur which comprises absorbing sulfur dioxide and hydrogen sulfide in a solvent comprising a carboxamide having the generic formula:

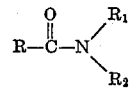

in which R, $R_1$ and $R_2$ are selected from the group consisting of hydrogen and alkyl radicals containing from 1 to 4 carbon atoms, and having from about 0.5% to about 40% by volume of water dissolved therein, reacting the sulfur dioxide and hydrogen sulfide in contact with said solvent, thereby forming sulfur, and separating the sulfur from said solvent.

2. A process for the production of sulfur which com- a solvent comprising dimethylformamide, and having from about 0.5% to about 40% by volume of water dissolved therein, reacting the sulfur dioxide and hydrogen sulfide in contact with said dimethylformamide, thereby forming sulfur, and separating the sulfur from said solvent.

3. A process for the production of sulfur which comprises absorbing sulfur dioxide and hydrogen sulfide in a solvent comprising diethylformamide, and having from about 0.5% to about 40% by volume of water dissolved therein, reacting the sulfur dioxide and hydrogen sulfide in contact with said diethylformamide, thereby forming sulfur, and separating the sulfur from said solvent.

4. A process for the production of sulfur which comprises absorbing sulfur dioxide and hydrogen sulfide in a solvent comprising dimethylacetamide, and having from about 0.5% to about 40% by volume of water dissolved therein, reacting the sulfur dioxide and hydrogen sulfide in contact with said dimethylacetamide, thereby forming sulfur, and separating the sulfur from said solvent.

5. A process for the production of sulfur which comprises absorbing sulfur dioxide and hydrogen sulfide in a solvent comprising diethylacetamide, and having from about 0.5% to about 40% by volume of water dissolved therein, reacting the sulfur dioxide and hydrogen sulfide in contact with said diethylacetamide, thereby forming sulfur, and separating the sulfur from said solvent.

6. A process for the production of sulfur which comprises absorbing sulfur dioxide and hydrogen sulfide in a solvent comprising dimethylpropionamide, and having from about 0.5% to about 40% by volume of water dissolved therein, reacting the sulfur dioxide and hydrogen sulfide in contact with said dimethylpropionamide, thereby forming sulfur, and separating the sulfur from said solvent.

References Cited in the file of this patent

UNITED STATES PATENTS

| | | |
|---|---|---|
| 2,550,446 | Blohm et al. | Apr. 24, 1951 |
| 2,881,047 | Townsend | Apr. 7, 1959 |

FOREIGN PATENTS

| | | |
|---|---|---|
| 734,577 | Great Britain | Aug. 3, 1955 |